July 21, 1970 MASAO KAWASHIMA ET AL 3,520,997

TIME DIVISION SIGNAL SYSTEM FOR INSERTING AND REMOVING SIGNALS

Filed April 13, 1966 3 Sheets-Sheet 1

TIME DIVISION SIGNAL SYSTEM FOR INSERTING AND REMOVING SIGNALS

Filed April 13, 1966 3 Sheets-Sheet 2

July 21, 1970 MASAO KAWASHIMA ET AL 3,520,997

TIME DIVISION SIGNAL SYSTEM FOR INSERTING AND REMOVING SIGNALS

Filed April 13, 1966 3 Sheets-Sheet 3

United States Patent Office 3,520,997
Patented July 21, 1970

3,520,997

TIME DIVISION SIGNAL SYSTEM FOR INSERTING AND REMOVING SIGNALS

Masao Kawashima and Shigehiko Hinoshita, Yokohama-shi, Japan, assignors to Fujitsu Limited, Kawasaki, Japan, a corporation of Japan Filed Apr. 13, 1966, Ser. No. 542,385
Claims priority, application Japan, Apr. 20, 1965, 40/23,339
Int. Cl. H04j 3/08
U.S. Cl. 179—15 9 Claims

ABSTRACT OF THE DISCLOSURE

A phase detector distant from a source of lower frequency signals compares the phase of lower frequency signals with the phase of the predetermined spaces of the higher frequency signals and provides an output control signal indicative of the difference in phase between the lower frequency signals and the predetermined spaces of the higher frequency signals. The control signal from the phase detector is transferred to the lower frequency signal source iva a first transmission line to control the phase of the lower frequency signals to reduce the difference in phase between the lower frequency signals and the predetermined spaces of the higher frequency signals. The combined higher and lower frequency signals are supplied to a second transmission line.

DESCRIPTION OF THE INVENTION

The present invention relates to a time division signal system for inserting and removing signals. More particularly, the invention relates to a time division signal system for inserting lower frequency time division signals with higher frequency time division signals and for removing the lower frequency time division signals from the higher frequency time division signals.

In a pulse code modulation or PCM system, time division multiplex signals must be converted in various ways. The various conversions include multiplexing, demultiplexing, insertion and removal. Multiplexing is the multiplication in time division of a plurality of lower frequency PCM signals, which are not necessarily in synchronism or phase, into higher frequency PCM signals, under the control of a common clock or time signal. The signals are pulses and the lower frequency is a lower pulse repetition rate or lesser number of pulses in a given time period. The upper frequency is a higher pulse repetition rate or greater number of pulses in a given time period. Demultiplexing is the opposite of multiplexing.

Insertion is the insertion of lower frequency time division signals with higher frequency time division signals. The lower frequency PCM signals are not necessarily in synchronism or phase. Removal is the opposite of insertion and is the removal of lower frequency time division signals from higher frequency time division signals.

Generally, in insertion or removal operations involving asynchronous or out-of-phase signals, information or data is lost. Even when the signals are in synchronism or in phase, data is lost due to delay variations in the transmission line. This results in a loss of transmission efficiency and accuracy or a loss of synchronization or phase relation in lower frequency signal receivers.

The principal object of the present invention is to provide a new and improved time division signal system for inserting and removing signals. The time division signal system of the present invention provides insertion and removal operations without the loss of data or information. The insertion and removal operations are accomplished with facility and simplicity and are efficient and reliable and permit efficiency and accuracy in transmission.

In accordance with the present invention, a time division signal system for inserting lower frequency time division signals with higher frequency time division signals comprises a higher frequency signal source for providing higher frequency time division signals with predetermined spaces between adjacent predetermined signals. A lower frequency signal source provides lower frequency time division signals. A phase detector compares the phase of the lower frequency signals with the phase of the predetermined spaces of the higher frequency signals and provides an output control signal indicative of the difference in phase between the lower frequency signals and the predetermined spaces of the higher frequency signals. The control signal is transferred from the phase detector to the lower frequency signal source and controls the phase of the lower frequency signals to reduce the difference in phase between the lower frequency signals and the predetermined spaces of the higher frequency signals. The lower frequency signals are then inserted in the predetermined spaces of the higher frequency signals in phase with such predetermined spaces. Space signals of equal phase with the predetermined spaces are provided and such space signals are compared in phase with the lower frequency signals by the phase detector in order to compare the phase of the predetermined spaces with the phase of the lower frequency signals. If the periods of the higher frequency signals are of equal duration and the periods of the lower frequency are of equal duration, and such higher and lower frequency signals are of similar configuration, the phase detector compares the phase of the lower frequency signals with the phase of the higher frequency signals.

In order that the present invention may be readily carried into effect, it will now be described with reference to the accompanying drawings, wherein.

Figure 1:
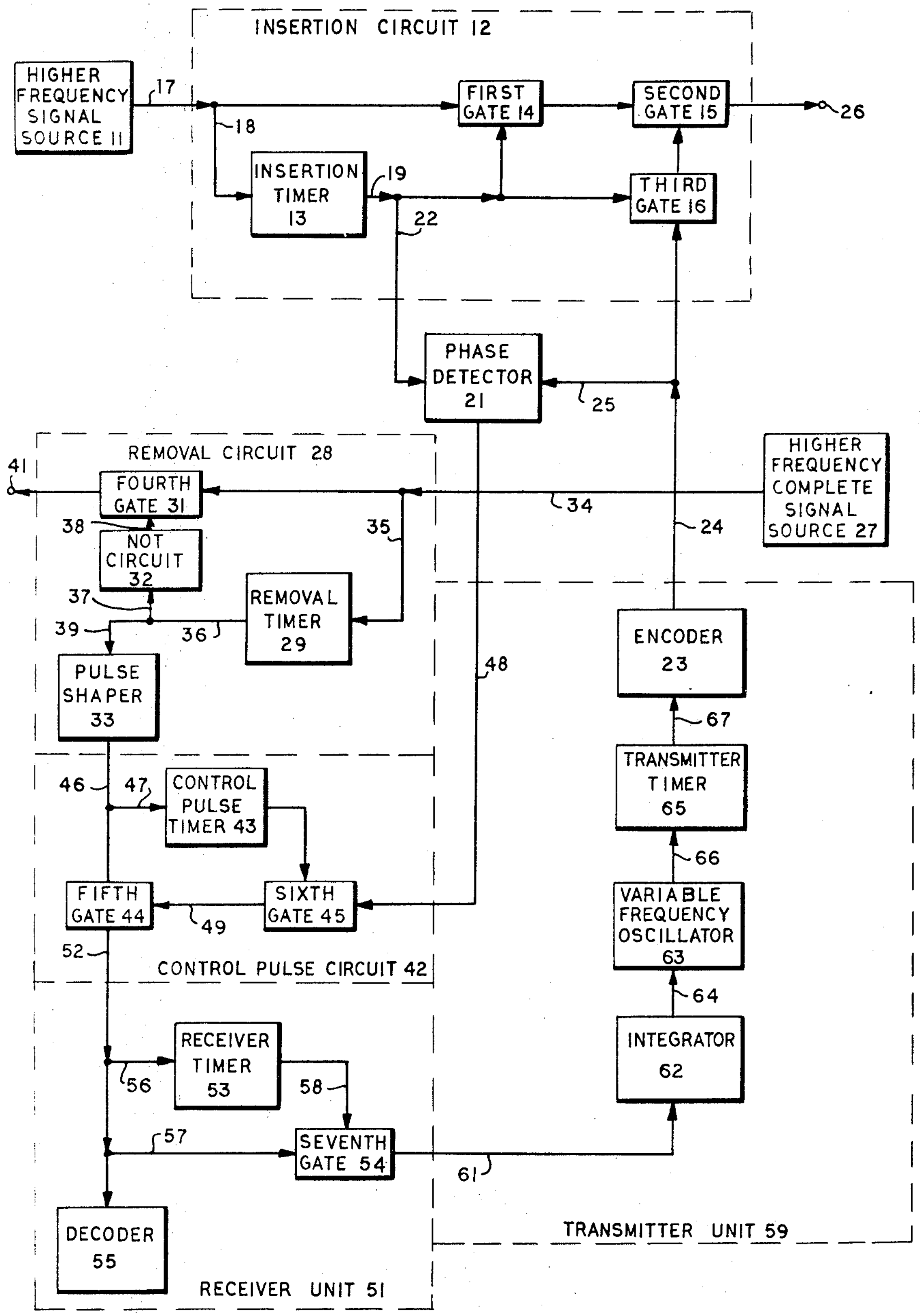
FIG. 1 is a block diagram of an embodiment of the time division signal system of the present invention.

In FIG. 1, higher frequency time division signals are provided by a higher frequency signal source 11 and are supplied to the input of an insertion circuit 12 comprising an insertion timer 13 and first, second and third gates 14, 15 and 16. The higher frequency time devision signals are supplied via a lead 17 to the first gate 14 and via the lead 17 and a lead 18 to the insertion timer 13. The higher frequency signals provided by the higher frequency signal source 11 have predetermined spaces between adjacent predetermined signals, as shown in curve A of FIG. 2, which indicates said higher frequency signals. It is in these spaces that the lower frequency signals are to be inserted. The first gate 14 comprises an inhibition gate which is utilized as a switch. The second gate 15 comprises an OR gate which provides an output whenever one or both of its inputs is energized. The third gate 16 comprises an AND gate which provides an output only when both of its inputs are simultaneously energized.

The insertion timer 13 provides a space pulse for each of the predetermined spaces between the higher frequency pulses provided by the higher frequency signal source 11. The space pulses are shown in curve B of FIG. 2. The space pulses provided by the insertion timer 13 are supplied to the third gate 16 via a lead 19 and to one input of a phase detector 21 via the lead 19 and a lead 22. An encoder 23 provides lower frequency time division signals to the third gate 16 via a transmission line 24 and to the other input of the phase detector via the lead 24 and a lead 25. The lower frequency signals are shown in solid lines in curve C of FIG. 2.

Figure 2:
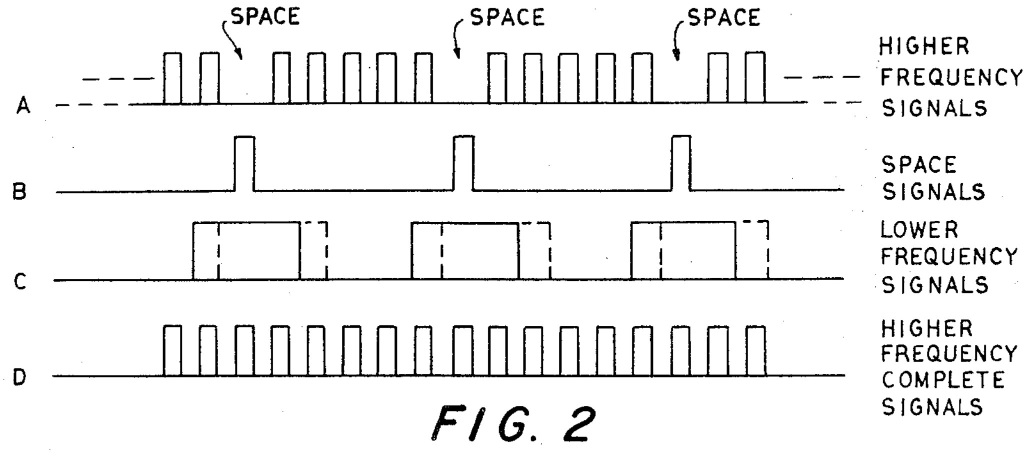
FIG. 2 is a graphical presentation of various signals appearing at different points in the time division signal system of FIG. 1.

The insertion circuit 12 functions to combine the lower frequency signals (FIG. 2, curve C) with the higher frequency signals (FIG. 2, curve A) by insertion in the predetermined spaces between said higher frequency signals. The higher frequency signals provided by the higher frequency signal source 11 are fed to the OR gate 15 via the inhibition gate 14. The inhibition gate 14 is controlled by the space signals (FIG. 2, curve B) provided by the insertion timer 13. The space signals provided by the insertion timer 13 control the AND gate 16 to transfer the lower frequency signals from the encoder 23 to the OR gate 15. The lower frequency signals are inserted in the predetermined spaces of the higher frequency signals so that the lower and higher frequency signals are combined in the OR gate 15 and are provided at a terminal 26 of a transmission line. The combined signals, as shown in curve D of FIG. 2, provided at the terminal 26 may be transmitted or utilized as desired.

Higher frequency time division signals which are complete, and have no spaces between predetermined adjacent signals similar to the higher frequency signals provided by the higher frequency signal source 11, are provided by a higher frequency complete signal source 27. The complete signals provided by the signal source 27 are the same as the combined signals provided at the terminal 26. The complete signals provided by the higher frequency complete signal source 27 are supplied to the input of a removal circuit 28 comprising a removal timer 29, a fourth gate 31, a NOT circuit 32 and a pulse shaper 33.

The complete time division signals are supplied via a lead 34 to the gate 31 and via the lead 34 and a lead 35 to the removal timer 29. The complete signals provided by the higher frequency complete signal source 27 are shown in curve D of FIG. 2. The fourth gate 31 comprises an AND gate. The removal timer 29 removes the pulses appearing at the predetermined spaces between adjacent predetermined pulses and provides the lower frequency signals shown in curve C of FIG. 2. The lower frequency pulses provided by the removal timer 29 are supplied to the AND gate 31 via a lead 36, a lead 37, the NOT circuit 32 and a lead 39 and to the input of the pulse shaper 33 via a lead 39.

The removal circuit 28 functions to remove the lower frequency signals (FIG. 2, curve C) from the higher frequency complete signals (FIG. 2, curve D) by removal from the predetermined spaces between said higher frequency signals. The lower frequency signals provided by the removal timer 29 control the AND gate 31 to transfer the higher frequency signals provided by the signal source 27 with spaces where the removed lower frequency signals were, as shown in curve A of FIG. 2. The higher frequency signals of curve A, FIG. 2, are then provided at a terminal 41 of a transmission line and are utilized as desired.

The spaces are provided in the complete signal by the action of the NOT circuit 32, which produces a signal, thereby making the AND gate 31 conductive to the higher frequency pulses from the signal source 27, each time no signal is fed to said NOT circuit. When the removal timer 29 provides a lower frequency pulse, however, said lower frequency pulse is fed to the NOT circuit 32 and said NOT circuit provides no signal, thereby making the AND gate 31 non-conductive to the higher frequency pulse which appears in the time period from which the lower frequency pulse is removed, so that the higher frequency pulses shown in curve A of FIG. 2 are provided at the terminal 41.

The lower frequency pulses provided by the removal timer 29 and supplied to the pulse shaper 33 are suitably shaped by said pulse shaper and are supplied to a control pulse circuit 42. The control pulse circuit 42 comprises a control pulse timer 43, a fifth gate 44 and a sixth gate 45. The lower frequency signals provided by the removal circuit 28 are supplied to the control pulse timer 43 via a lead 46 and a lead 47 and to the fifth gate 44, which is an OR gate, via lead 46. The control pulse timer 43 provides the space pulses, as shown in curve B of FIG. 2, from the lower frequency signals supplied to it and said space pulses are fed to the sixth gate 45, which is an AND gate, and control said gate.

In accordance with the present invention, the phase detector 21 is provided. The space pulses provided by the insertion timer 13 and supplied to one input of the phase detector 21 and the lower frequency signals provided by the encoder 23 and supplied to the other input of said phase detector are compared in phase. As a result of such pulse comparison by the phase detector 21, said phase detector provides an output control signal indicative of the difference in phase between the lower frequency signals and the predetermined spaces of the higher frequency signals. This is necessary, because the lower frequency signals, as shown in curve C of FIG. 2, may shift in phase, as shown by broken lines in said curve, and thereby cause the loss of data or information. The control signal provided by the phase detector 21 is fed to the AND gate 45 of the control pulse circuit 42 via a lead 48.

Figure 3:
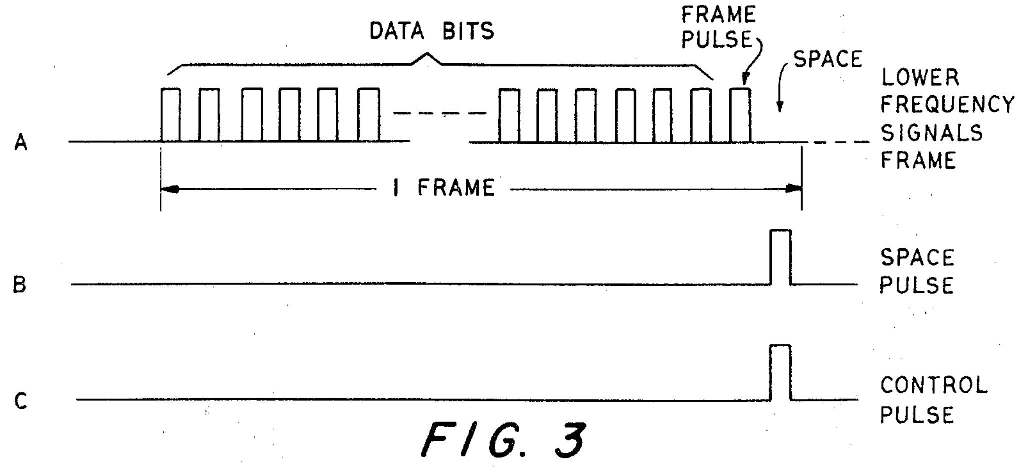
FIG. 3 is a graphical presentation of various other signals appearing in the control pulse circuit 42 of the time division signal system of FIG. 1.

The space pulses provided by the control pulse timer 43 control the conductive condition of the AND gate 45 to transmit a control signal from the phase detector 21 each time a space pulse occurs. Thus, a control signal from the phase detector 21 is transmitted by the AND gate 45 and fed to the OR gate 44, via a lead 49, for each predetermined space of the higher frequency signals. The control signal appears in a one bit space next succeeding the frame pulse space of a frame of lower frequency signals; said space pulse appearing instead of and corresponding to said one bit space and being replaced by the control signal from the phase detector 21 in the AND gate 45, as shown by curves A, B and C of FIG. 3. Curve A of FIG. 3 shows one frame of lower frequency signals, curve B shows the space pulse and curve C shows the control pulse.

The control pulse from the phase detector 21 is combined with the lower frequency signals in the OR gate 44 of the control pulse circuit 42 and the combined pulses are supplied to a receiver unit 51 via a lead 52. The receiver unit 51 comprises a receiver timer 53, a seventh gate 54 comprising an AND gate and a decoder 55. The combined lower frequency and control pulses from the OR gate 44 of the control pulse circuit 42 are supplied to the receiver timer 53 of the receiver unit 51 via the lead 52 and a lead 56 and are supplied to the decoder 55 via the lead 52. The decoder 55 functions to decode the lower frequency signals and to provide the data thereby derived for desired utilization. The combined lower frequency and control pulses from the OR gate 44 are also supplied to the AND gate 54 via the lead 52 and a lead 57.

The receiver timer 53 provides the space pulses from the lower frequency and control pulses supplied to it, in the same manner that the control pulse timer 43 provides the space pulses from the lower frequency signals, and feeds said space pulses to the seventh gate 54 via a lead 58. The space pulses control the conductive condition of the AND gate 54 to transfer a control signal from the OR gate 44 each time a space pulse occurs. The control pulses provided by the AND gate 54 are supplied to a transmitter unit 59 via a lead 61.

The transmitter unit 59 comprises an integrator 62, a variable frequency oscillator 63 having an input connected to the output of said integrator via a lead 64, a transmitter timer 65 having an input connected to the output of the oscillator 63 via a lead 66 and an output connected to the input of the encoder 23 via a lead 67, which encoder is included in the transmitter unit 59. The transmitter unit 59 produces the lower frequency time division signals which are supplied to the insertion circuit 12 via the lead 24, the AND gate 16 and the OR gate 15.

The integrator 62 shapes and supplies the control pulses to the variable frequency oscillator 63. The control pulses vary the frequency of the oscillator 63 in accordance with the difference in phase between the lower frequency signals and the predetermined spaces of the higher frequency signals, as determined by the phase detector 21. The variable frequency oscillator 63 controls the operation of the transmitter timer 65 so that the lower frequency signals provided by the encoder 23 are in phase with the predetermined spaces in which they are inserted in the OR gate 15 of the insertion circuit 12.

In the time division signal system of the present invention, the phase difference between the lower frequency signals and the predetermined spaces of the higher frequency signals is the same as the phase difference between the lower frequency signals and the higher frequency signals when the periods of the higher frequency pulses are of equal duration and the periods of the lower frequency pulses are of equal duration and the pulses are of similar configuration. The control of the phase of the lower frequency signals is more favorable when the variation in time of the phase difference between the lower frequency signals and the predetermined spaces of the higher frequency signals is small in comparison with the delay of the output control signal of the phase detector 21 in transfer to the receiver and transmitter units 51 and 59 and in transfer of the lower frequency signals to said phase detector. This is the case, in practical operation, due to transmission delay variation caused by temperature variation in which such delay variation is relatively long and the higher and lower frequencies are stable. Furthermore, the receiver unit 51 may be utilized in place of the removal circuit 28, if the lower frequency and higher frequency signals are of similar configuration, thereby further simplifying the circuitry.

The time division signal system of the present invention obviously operates with time division signals in general having a constant period or pulse spacing and is not limited to binary code, which is used as an illustration of operation. The insertion and removal of time division signals is achieved by the time division signal system of the present invention without loss of data or information and said system is thus especially suitable for time division communications systems.

Figure 4:
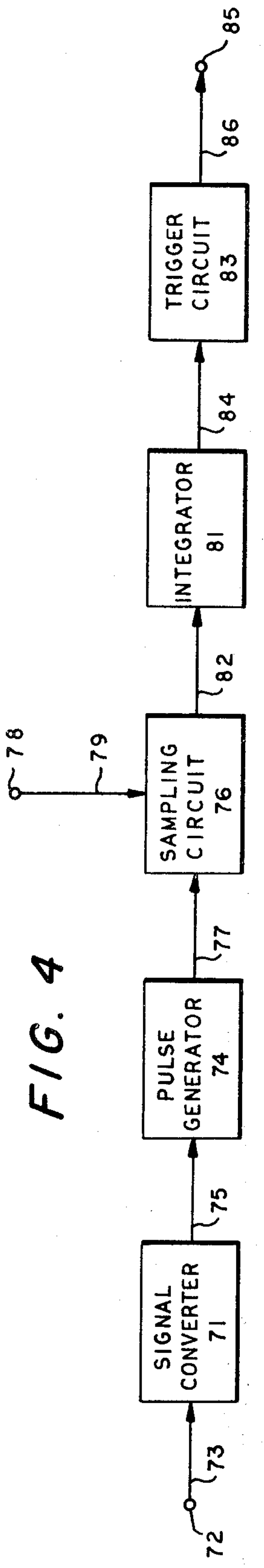
FIG. 4 is a block diagram of the embodiment of a phase detector which may be utilized as the phase detector 21 of the time division signal system of FIG. 1.

A phase detector which may be utilized as the phase detector 21 of the time division signal system of the present invention is shown in FIG. 4. The phase detector of FIG. 4 comprises a signal converter 71 having an input connected to an input terminal 72 via a lead 73 and an output connected to the input of a pulse generator 74 via a lead 75. A sampling circuit 76 has an input connected to the output of the pulse generator 74 via a lead 77 and an input connected to an input terminal 78 via a lead 79. The output of the sampling circuit 76 is connected to the input of an integrator 81 via a lead 82. A trigger circuit 83 has an input connected to the output of the integrator 81 via a lead 84 and an output connected to an output terminal 85 via a lead 86.

Figure 5:
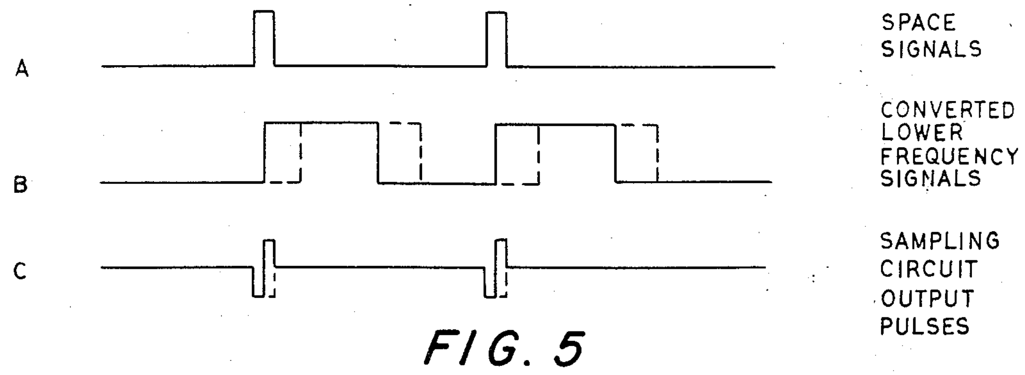
FIG. 5 is a graphical presentation of various signals appearing at different points in the inputs and output of the phase detector 21 of the time division signal system of FIG. 1.

The lower frequency time division signals are supplied via the input terminal 72 and the lead 73 to the signal converter 71. The lower frequency signals are shown in curve A of FIG. 3. The space pulses, shown in curve A of FIG. 5, are supplied via the input terminal 78 and the lead 79 to the sampling circuit 76. The signal converter 71 converts the lower frequency signals into a sine wave having the basic period of said lower frequency signals. The signal converter 71 may comprise a tuning circuit or a pull-in oscillator.

The pulse generator 74 is energized by the sine wave produced by the signal converter 71 and produces a square wave, shown in curve B of FIG. 5. The leading edges of the square wave produced by the pulse generator 74 occur at the midpoint between the leading and trailing edges of the space pulses. The square wave has a duty ratio of one half and is sampled by the space pulses in the sampling circuit 76. The sampling of the square wave by the space pulses in the sampling circuit 76 produces pulses, as shown in curve C of FIG. 5, which are integrated by the integrator 81 and are then fed to the trigger circuit 83 which converts said pulses into control pulses or control signals as shown in curve C of FIG. 3. The trigger circuit 83 may comprise a Schmitt trigger circuit.

If the lower frequency signals shift in phase so that they are not in phase with the predetermined spaces of the higher frequency signals, as represented by the space signals, the converted lower frequency signals of curve B of FIG. 5 and the sampling circuit output pulses of curve C of FIG. 5 are as shown by the broken lines in such curves. If such phase shift is in a leading direction, a "1" signal may be produced, and if such phase shift is in a lagging direction, a "0" signal may be produced.

Figure 6:
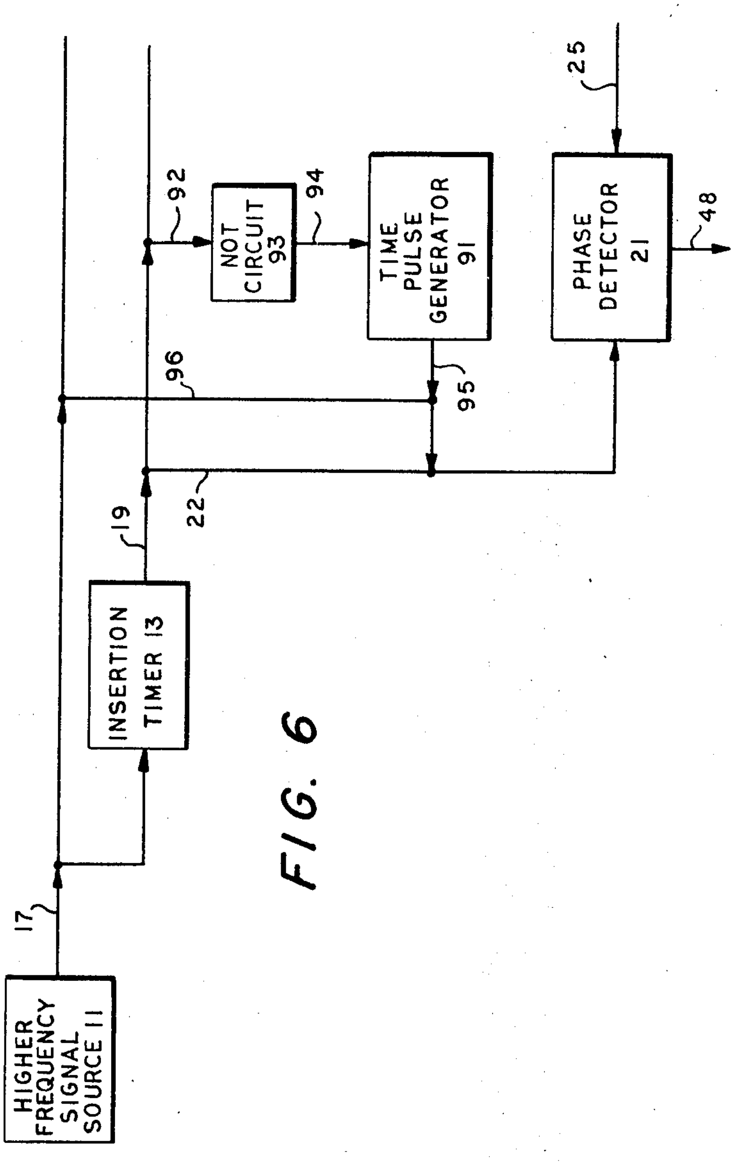
FIG. 6 is a block diagram of a modification of a part of the time division signal system of FIG. 1.

FIG. 6 shows a modification of a part of the time division signal system of FIG. 1. The modification of FIG. 6 is for the prevention of disruption of operation of the time division signal system of the present invention in the event that the higher frequency signal source 11 of FIG. 1 becomes inoperative. In the modification of FIG. 6 a clock or time pulse generator 91 has an input connected to the lead 19 via a lead 92, a NOT circuit 93 and a lead 94 and an output connected to an input of the phase detector 21 via a lead 95 and the lead 22 and to the lead 17 via a lead 96 and the lead 95. The time pulse generator 91, when operative, provides time pulses having the same frequency or repetition rate as the higher frequency signals provided by the higher frequency signal source 11. The time pulse generator 91 may comprise a pull-in oscillator which operates at the frequency of the higher frequency signals.

During normal operation, the space signals provided by the insertion timer 13 are supplied to the NOT circuit 93 and the NOT circuit produces no signal, so that the time pulse generator 91 is maintained inoperative. If the higher frequency signal source 11 becomes inoperative, there are no signals supplied to the NOT circuit 93, so that said NOT circuit produces output signals which are fed to the generator 91 and operate said generator. The generator 91 then provides clock or time pulses in place of the higher frequency signals cut off by the inoperativeness of the higher frequency signal source.

While the invention has been described by means of a specific example and in a specific embodiment, we do not wish to be limited thereto, for obvious modifications will occur to those skilled in the art without departing from the spirit and scope of the invention.

We claim:

1. A time division signal system for inserting lower frequency time division signals with higher frequency time division signals, comprising higher frequency generating signal means for providing higher frequency time division signals with predetermined spaces between adjacent predetermined signals;

lower frequency generating signal means distant from said higher frequency generating signal means for providing lower frequency time division signals;

phase detecting means distant from said lower frequency generating signal means for comparing the phase of said lower frequency signals with the phase of the predetermined spaces of said higher frequency signals and for providing an output control signal indicative of the difference in phase between said lower frequency signals and the predetermined spaces of said higher frequency signals;

a first transmission line;

transmission line transfer means for transferring said control signal from said phase detecting means to said lower frequency signal generating means via said first transmission line for controlling the phase of said lower frequency signals to reduce the difference in phase between said lower frequency signals and the predetermined spaces of said higher frequency signals;

a second transmission line; and combining means for inserting said lower frequency signals in the predetermined spaces of said higher frequency signals in phase with said predetermined spaces and supplying the combined signals to said second transmission line.

2. A time division signal system for inserting lower frequency time division signals with higher frequency time division signals, comprising higher frequency generating signal means for providing higher frequency time division signals with predetermined spaces between adjacent predetermined signals;

lower frequency generating signal means distant from said higher frequency generating signal means for providing lower frequency time division signals;

phase detecting means distant from said lower frequency generating signal means for comparing the phase of said lower frequency signals with the phase of the predetermined spaces of said higher frequency signals and for providing an output control signal indicative of the difference in phase between said lower frequency signals and the predetermined spaces of said higher frequency signals, the periods of said higher frequency signals being of equal duration and the periods of said lower frequency signals being of equal duration, said higher and lower frequency signals being of similar configuration, and said phase detecting means comparing the phase of said lower frequency signals with the phase of said higher frequency signals;

a first transmission line;

transmission line transfer means for transferring said control signal from said phase detecting means to said lower frequency signal generating means via said first transmission line for controlling the phase of said lower frequency signals to reduce the difference in phase between said lower frequency signals and the predetermined spaces of said higher frequency signals;

a second transmission line; and combining means for inserting said lower frequency signals in the predetermined spaces of said higher frequency signals in phase with said predetermined spaces and supplying the combined signals to said second transmission line.

3. A time division signal system for inserting lower frequency time division signals with higher frequency time division signals, comprising higher frequency generating signal means for providing higher frequency time division signals with predetermined spaces between adjacent predetermined signals;

lower frequency generating signal means distant from said higher frequency generating signal means for providing lower frequency time division signals;

phase detecting means distant from said lower frequency generating signal means for comparing the phase of said lower frequency signals with the phase of the predetermined spaces of said higher frequency signals and for providing an output control signal indicative of the difference in phase between said lower frequency signals and the predetermined spaces of said higher frequency signals;

a first transmission line;

transmission line transfer means for transferring said control signal from said phase detecting means to said lower frequency signal generating means via said first transmission line for controlling the phase of said lower frequency signals to reduce the difference in phase between said lower frequency signals and the predetermined spaces of said higher frequency signals;

a second transmission line;

combining means for inserting said lower frequency signals in the predetermined spaces of said higher frequency signals in phase with said predetermined spaces and supplying the combined signals to said second transmission line; and means for providing space signals of equal phase with said predetermined spaces, said phase detecting means comparing the phase of said lower frequency signals with the phase of said space signals.

4. A time division signal system as claimed in claim 3, wherein said phase detecting means comprises sampling means having two inputs and an output, input means for supplying said lower frequency signals to one of said inputs, means for supplying said space signals to the other of said inputs, said sampling means producing output pulses corresponding to said phase difference, and output means connected to the output of said sampling means for converting the output pulses of said sampling means.

5. A time division signal system as claimed in claim 4, wherein said input means comprises signal converter means for converting said lower frequency signals to a sine wave and pulse generating means connecting said signal converting means to said one of said inputs of said sampling means for converting said sine wave to a square wave.

6. A time division signal system as claimed in claim 5, wherein said output means comprises integrator means connected to the output of said sampling means and trigger means connected to said integrator means for providing said control signal.

7. A time division signal system as claimed in claim 6, further comprising a time pulse generator for producing pulses having the same repetition rate as said higher frequency signals and having an output connected to an input of said phase detecting means and to the output of said higher frequency signal means and an input coupled to the output of said higher frequency signal source, and generator energizing means in the input of said time pulse generator for maintaining said generator inoperative during operation of said higher frequency signal means and for operating said generator during nonoperation of said higher frequency signal means.

8. A time division signal system for inserting lower frequency time division signals with higher frequency time division signals, comprising higher frequency generating signal means for providing higher frequency time division signals with predetermined spaces between adjacent predetermined signals;

lower frequency generating signal means distant from said higher frequency generating signal means for providing lower frequency time division signals;

phase detecting means distant from said lower frequency generating signal means for comparing the phase of said lower frequency signals with the phase of the predetermined spaces of said higher frequency signals and for providing an output control signal indicative of the difference in phase between said lower frequency signals and the predetermined spaces of said higher frequency signals;

a first transmission line;

transmission line transfer means for transferring said control signal from said phase detecting means to said lower frequency signal generating means via said first transmission line for controlling the phase of said lower frequency signals to reduce the difference in phase between said lower frequency signals and the predetermined spaces of said higher frequency signals;

a second transmission line;

combining means for inserting said lower frequency signals in the predetermined spaces of said higher frequency signals in phase with said predetermined spaces and supplying the combined signals to said second transmission line;

a time pulse generator for producing pulses having the same repetition rate as said higher frequency signals and having an output connected to an input of said phase detecting means and to the output of said higher frequency signal means and an input coupled to the output of said higher frequency signal source; and generator energizing means in the input of said time pulse generator for maintaining said generator inoperative during operation of said higher frequency signal means and for operating said generator during non-operation of said higher frequency signal means.

9. A time division signal system for inserting lower frequency time division signals with higher frequency time division signals, comprising higher frequency generating signal means for providing higher frequency time division signals with predetermined spaces between adjacent predetermined signals;

lower frequency generating signal means distant from said higher frequency generating signal means for providing lower frequency time division signals;

phase detecting means distant from said lower frequency generating signal means for comparing the phase of said lower frequency signals with the phase of the predetermined spaces of said higher frequency signals and for providing an output control signal indicative of the difference in phase between said lower frequency signals and the predetermined spaces of said higher frequency signals;

a first transmission line;

transmission line transfer means for transferring said control signal from said phase detecting means to said lower frequency signal generating means via said first transmission line for controlling the phase of said lower frequency signals to reduce the difference in phase between said lower frequency signals and the predetermined spaces of said higher frequency signals;

a second transmission line;

combining means for inserting said lower frequency signals in the predetermined spaces of said higher frequency signals in phase with said predetermined spaces and supplying the combined signals to said second transmission line; and a third transmission line for transmitting said lower frequency signals to said phase detecting means, said first transmission line for transferring said control signal from said phase detecting means to said lower frequency signal means transmitting in a direction opposite the third transmission line for transferring said lower frequency signals.

References Cited

UNITED STATES PATENTS

| | | | |
|---|---|---|---|
| 2,912,508 | 11/1959 | Hughes | 179—15 |
| 3,355,549 | 11/1967 | Alexander et al. | 325—13 |

KATHLEEN H. CLAFFY, Primary Examiner

A. B. KIMBALL, JR., Assistant Examiner